United States Patent [19]
Roitto

[11] Patent Number: 6,074,700
[45] Date of Patent: Jun. 13, 2000

[54] REMOVING FOREIGN MATERIAL FROM COATING MIX IN A CIRCULATION SYSTEM FOR COATING

[75] Inventor: Ilkka Roitto, Masku, Finland

[73] Assignee: Valmet-Raisio OY, Raisio, Finland

[21] Appl. No.: 09/190,523

[22] Filed: Nov. 12, 1998

[30] Foreign Application Priority Data

Nov. 13, 1997 [FI] Finland ..................................... 974227

[51] Int. Cl.[7] .............................. B05D 3/12; B05C 11/10
[52] U.S. Cl. ........................... 427/345; 118/603; 118/610
[58] Field of Search .................................... 118/603, 610, 118/50; 427/345

[56] References Cited

U.S. PATENT DOCUMENTS

| | | | |
|---|---|---|---|
| 4,102,299 | 7/1978 | Wallsten | 118/603 |
| 5,401,899 | 3/1995 | Bryant et al. | 118/603 |

Primary Examiner—Katherine A. Bareford
Attorney, Agent, or Firm—Cohen, Pontani, Lieberman & Pavane

[57] ABSTRACT

A method and apparatus for separating foreign material from coating mix flow circulating in the machine circulation of a coating station (7) in coaters used for coating a web of paper or board. Coating mix is conveyed from a tank (1) to a coating station, where it is applied to the surface of the web to be coated, and the excess of the coating mix conveyed to the coating station (7) is returned to the tank (1). The coating mix flow incoming from said tank (1) to the coating station is screened by at least one pressure screen (5) and the rejects fraction of the coating mix flow is discharged from the pressure screen (5). A portion of the coating mix flow circulating in the machine circulation is passed through a vibrating screen (13) and the accepts fraction of the vibrating screen is returned back to the machine circulation. The invention offers high efficiency in the removal of elongated foreign matter particles from the machine circulation of coating mix.

10 Claims, 1 Drawing Sheet

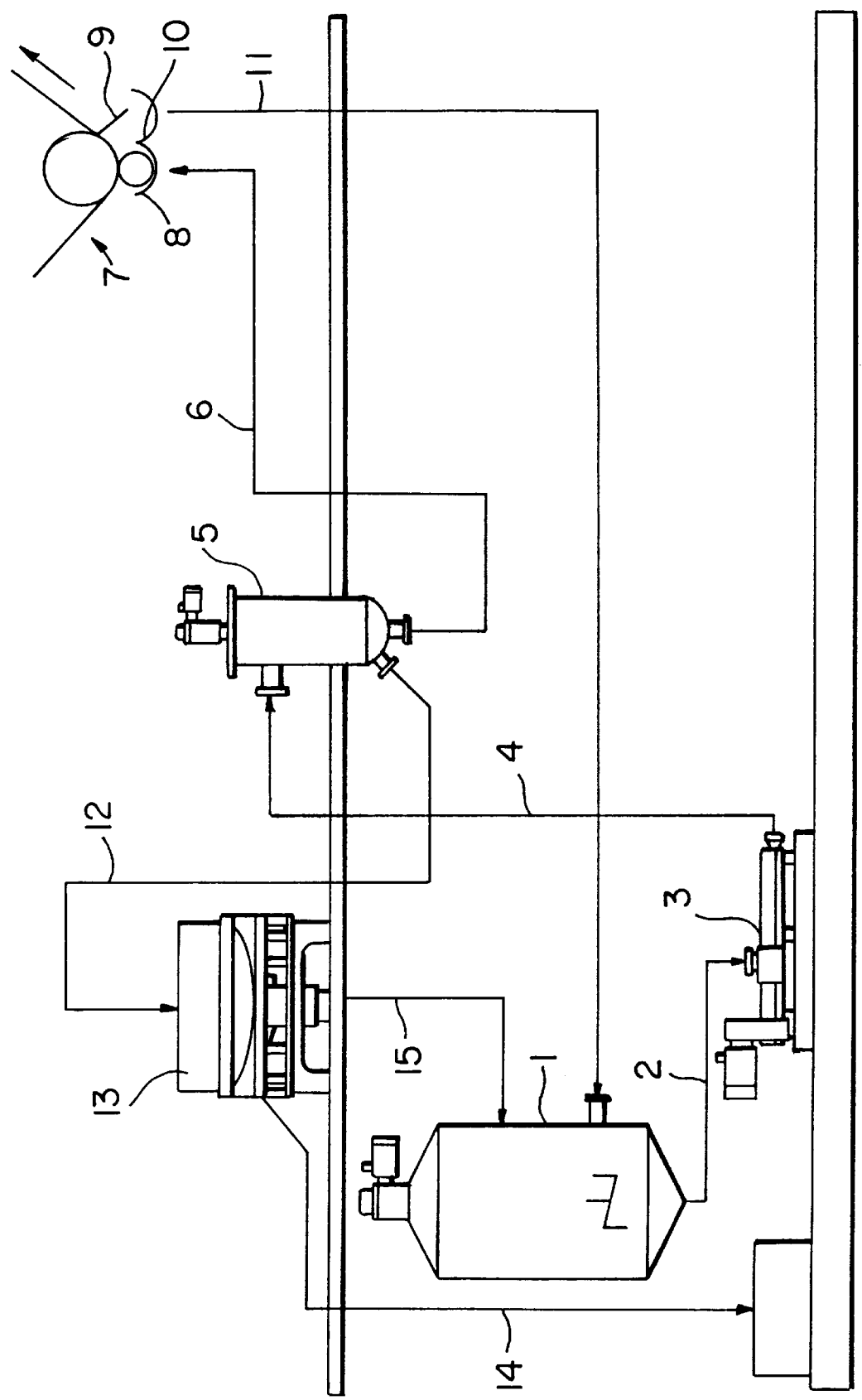

REMOVING FOREIGN MATERIAL FROM COATING MIX IN A CIRCULATION SYSTEM FOR COATING

FIELD OF THE INVENTION

The present invention relates to a method and apparatus for separating foreign material from the coating mix flow circulating in the machine circulation of a coating station in coaters used for coating paper and board.

BACKGROUND OF THE INVENTION

In coaters, the coating mix is applied to the paper or board web by means of an applicator device, and then the applied coating mix is smoothed to the desired thickness by means of a doctoring device. Conventionally, an excess amount of the coating mix is applied on the web at the coater, and in a plurality of different kinds of applicators a so-called machine circulation is used for treating the coating mix not adhering to the web. The machine circulation of the applicator and the excess coating mix doctored away from the web are returned to the storage tank of the coater, wherefrom the coating mix is again pumped to the coater. As the coating mix to be pumped to the coating station must be free from impurities, the machine circulation between the coating mix feed pump and the coating station must be provided with a pressure strainer to clean the coating mix to remove foreign material picked up from the web, paper pieces coming into the circulating coating mix from web breaks, and lumps possibly formed from coating mix aggregates. Such strainers chiefly comprise washable screens of the back-wash type or alternatively screens made from a wedge wire of triangular cross section and cleaned by mechanical scrapers. Today, the trend is away from back-wash screens, because the washing of the screen creates a great volume of coat-containing waste water that loads the wastewater cleaning system of the paper mill. Further, coating mix material losses in washable screens are greater than those of mechanically cleanable screens.

Mechanically cleanable screens are closed pressure vessels in which the coat is conveyed from a higher pressure to a lower pressure through the screening element. The screening element is made by coiling a continuous strand of triangular wire onto a cylinder, whereby the coat-passing gaps are formed between the adjacent turns of coiled wire. The width of the interwire gap is about 100–150 μm and its length is very large, because a single, continuous gap will be formed by the length of wire wound on the cylindrical filter surface. This type of coil wire screen is cleaned by allowing a scraper element to pass over the cylindrical screen surface and the rejected material collected by the screen is removed at, e.g., 8 hour intervals by opening the rejects discharge valve. Herein, the rejects discharge valve is opened to discharge a few tens of liters (10–30 ) of the coating mix rejects that are next sewered to the waste treatment system of the paper mill. While pressure screens of this type have a large screening capacity per unit area of the screen surface, they are, due to the shape of the interwire gap, incapable of effectively separating foreign material of a long fibrous shape. As a result, the machine circulation of coating stations will gradually accumulate such fibrous particles whose sticking under the nip of doctor element in the coating station will cause striping of the applied coating mix, thus marring the produced paper web. Another nuisance caused by fibrous foreign material is the clogging of the screen gaps when the elongated fibers plug the screen mesh. Oblong fibers will orient themselves with the flow pattern, whereby they can either pass through the screen mesh or plug the mesh openings. Such long, fibrous foreign material will accumulate into the machine circulation of the coating mix from the coating mix return flow in the form fibers detached from the web being coated and of synthetic fibers which adhere to the web surface from the dryer felt and later become detached from web during the coating step. Since this kind of foreign material causes a significant load in maintenance and cleaning of the screens, its elimination from the machine circulation is of major importance. Mechanically cleaned pressure screens are still today handicapped by the large amount of coating mix rejects that increases the load of waste treatment equipment, since a single coater line conventionally includes a number of screens and from each of them must be discharged tens of liters of rejects into the sewer about three times a day.

SUMMARY OF THE INVENTION

It is an object of the present invention to provide a method and an apparatus capable of effectively removing elongated fibrous foreign material from the machine circulation of coating stations, thus reducing the amount of discharged rejects.

The goal of the invention is achieved by mounting in the machine circulation of return coating mix at least one vibrating screen through which a portion of the total volume of coating mix circulating in the machine circulation is passed.

According to a preferred embodiment of the invention, the portion of coating mix flow passed to the vibrating screen is taken from the rejects discharge line of the pressure screen.

The invention offers significant benefits.

The most important benefit of the invention to paper and board manufacturers can be seen as improvement of product quality and higher consistency of product quality. As the amount of fibrous foreign material in the coating mix is decreased, coating mix striping due to such foreign material is correspondingly diminished. The need for maintenance of pressure screens and their plugging are reduced, thus achieving savings in operating costs and higher efficiency of screens, because the pressure drop over the screens due to their blinding does not increase as rapidly as in conventional systems. The invention may be readily adapted to existing installations and no changes in coating stations are required. The investment costs of its implementation are low. In the case that the incoming coating mix to the vibrating screen is taken from the rejects discharge line of the pressure screens, the usable fraction of coating mix can be separated therefrom and returned to the storage tank of circulating coat. Then, the remaining fraction is formed by the actual rejects, the amount of which is very small owing to the marginal proportion of foreign material in the circulating coat.

Other objects and features of the present invention will become apparent from the following detailed description considered in conjunction with the accompanying drawing. It is to be understood, however, that the drawing is intended solely for purposes of illustration and not as a definition of the limits of the invention, for which reference should be made to the appended claims.

BRIEF DESCRIPTION OF THE DRAWING

In the following, the invention will be described in greater detail by making reference to the appended FIGURE which illustrates schematically a coating station with a typical coating mix circulation implemented according to the present invention.

DETAILED DESCRIPTION OF THE PRESENTLY PREFERRED EMBODIMENTS

In the machine circulation of coating mix shown in the FIGURE, the fresh batch of coating mix is first introduced into a storage tank 1, wherefrom the coating mix is sucked along a line 2 to a pump 3. The pump 3 transfers the coating mix under pressure to a pressure screen 5 along a line 4 and the cleaned coating mix is next conveyed along a line 6 to the applicator device 8 of the coating station 7. Pressure along the coating mix transfer line drops at the point where the coating mix passes through the screen 5, whereby the pressure of the coating mix flow at the infeed of the applicator device is normally hardly higher than the ambient pressure. On the other hand, the required infeed line pressure of coating mix is dependent on the coater type. In the illustrated example, the applicator device 8 is a transfer roll, whose coating mix pan is maintained at atmospheric pressure. However, since the type of coater is not related to the implementation of the invention, the applicator used may as well be a short-dwell coater, a film transfer coater, a jet applicator or any other kind of coater. While the scraper element shown here is a scraper blade 9, the coating mix may alternatively be levelled using doctor bars or an air knife. The excess coating mix is collected into a pan 10, wherefrom it is conveyed via a line 11 back to the storage tank 1. This part of the machine circulation is equivalent to a typical machine circulation in a coating station.

In a machine circulation according to the invention, the conventional machine circulation of coating mix is complemented with a vibrating screen 13, through which a portion of the coating mix flow is circulated. In the exemplifying embodiment, the vibrating screen 13 is connected via a line 12 to the rejects discharge nozzle of the pressure screen 5 and the nozzle of the accepts fraction, which is the directly usable portion of the cleaned coating mix, is connected via a line 15 to the storage tank 1. The rejects fraction of the vibrating screen is discharged via a line 14. The vibrating screen 13 is made from a planar weaved wire cloth with mesh openings of a suitable size. To make the vibrating screen 13 operate efficiently in parallel with the pressure screen 5, its mesh openings must be sufficiently small, advantageously about 100 µm, but in practice a mesh size smaller than about 150 µm is sufficient and in some cases even a 200 µm mesh is usable. The screen cloth is vibrated at a suitable frequency, whereby the coating mix passing over the cloth will pass through the openings under the hydrostatic pressure imposed by the overlying thin coating mix layer, but simultaneously the cloth will not become clogged by oversized particulate matter. In a vibrating screen, the flow will not cause pulp fibers and fibrous particles detached from the wire to orient themselves parallel to the flow pattern. Moreover, the vibrating forces will align the fibrous particles parallel to the fabric, whereby they cannot pass the mesh openings of the strainer fabric even if their diameter would be smaller than that of the openings. Hence, a vibrating screen is particularly efficient in separating elongated foreign particulate matter from the coat.

The screening capacity of a vibrating screen in respect to its filtration area is low, which means that it is not suited for treating large amounts of coat. However, as the fibrous foreign material fortunately occurs only in small amounts in the circulating coat, they can be effectively removed by simply passing via the vibrating screen only a portion of the coating mix flow treated in a pressure screen. The screening efficiency is further improved by virtue of taking the incoming coating mix flow to the vibrating screen in the above-described manner from the rejects discharge line of the pressure screen, where the concentration of foreign material is higher. Advantageously, the portion of coating mix circulated via the vibrating screen is about 5–30% of the volumetric rate of coating mix conveyed via the machine circulation. As the volume proportion of coating mix contained in the machine circulation normally is about 1/10–1/20, the total storage volume of coating mix will pass via the vibrating screen at least once on the average during its stay in the volume of coating mix passing via the machine circulation. Hence, a sufficient coating mix handling capacity of the vibrating screen or screens can be readily attained without the need for increasing the number or size of the vibrating screens to impracticable dimensions.

In addition to those described above, the present invention may have alternative embodiments.

The vibrating screen can be implemented using an open vibrating screen or other type of screen having mesh openings of non-slot-like geometry. Instead of utilizing the rejects discharge line of the pressure screens the vibrating screen may also be connected to other points of the machine circulation, but then the separation step will not be carried out on the rejects fraction of the pressure screens that must thence be discarded entirely. Should the vibrating screen be connected to the machine circulation at a point between the pressure screen and the coating station, it cannot prevent the plugging of the pressure screen, whereby it would not be possible to effectively screen away fibrous foreign material, because a portion thereof is then captured by the pressure screen and another portion will cause the clogging of the pressure screen. In addition to the above-described exemplifying embodiment, other techniques may be contemplated in which the vibrating screen is connected to the return line of the coating station, or alternatively, coating mix taken from the storage tank is circulated via the screen by means of a pump. Obviously, the number,of vibrating screens and pressure screens connected to a coating station may be varied and, in practice, the number thereof is typically greater than one, whereby at any time a number of the screens may be maintenanced without causing a shutdown of the coating station.

Thus, while there have been shown and described and pointed out fundamental novel features of the present invention as applied to a preferred embodiment thereof, it will be understood that various omissions and substitutions and changes in the form and details of the device illustrated, and in its operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawing is not necessarily drawn to scale but that it is merely conceptual in nature. It is the intention, therefore, to be limited only as indicated by the scope of the claims appended hereto.

What is claimed is:

1. A method for separating foreign material from coating mix flowing in a circulation system for a coating station used for coating a web of paper or board, the method comprising:

conveying coating mix from a storage tank to a coating station where the coating mix is applied to a surface of a web of paper or board to be coated;

returning excess coating mix from the coating station to the storage tank;

screening the coating mix with a pressure screen after the coating mix leaves the storage tank and before the coating mix arrives at the coating station so that an accepts fraction of the coating mix from the pressure screen is conveyed to the coating station and so that a rejects fraction of the coating mix is discharged from the pressure screen; and screening the rejects fraction of the coating mix discharged from the pressure screen through a vibrating screen so that an accepts fraction of the coating mix from the vibrating screen is conveyed to the storage tank.

2. The method of claim 1, wherein screening of the coating mix in the vibrating screen is performed with a screen having openings which have a diameter of smaller than about 150 µm.

3. The method of claim 2, wherein screening of the coating mix in the vibrating screen is performed with a screen having openings which are not slot-shaped.

4. The method of claim 2, wherein screening of the coating mix in the vibrating screen is performed with a screen having openings which have a diameter of about 100 µm.

5. The method of claim 2, wherein about 5% to about 30% of a volumetric flow of coating mix conveyed to the coating station is screened by the vibrating screen.

6. The method of claim 1, wherein about 5% to about 30% of a volumetric flow of coating mix conveyed to the coating station is screened by the vibrating screen.

7. An apparatus for separating foreign material from coating mix flowing in a circulation system for a coating station used for coating a web of paper or board, the apparatus comprising:

a storage tank;

a coating station where coating mix is applied to a surface of a web of paper or board to be coated;

a means for conveying coating mix from the storage tank to the coating station;

a means for returning excess coating mix from the coating station to the storage tank;

a pressure screen positioned to screen the coating mix after the coating mix leaves the storage tank and before the coating mix arrives at the coating station so that an accepts fraction of the coating mix from the pressure screen is conveyed to the coating station and so that a rejects fraction of the coating mix is discharged from the pressure screen; and a vibrating screen positioned to screen the rejects fraction of the coating mix discharged from the pressure screen so that an accepts fraction of the coating mix from the vibrating screen is conveyed to the storage tank.

8. The apparatus of claim 7, wherein said vibrating screen has openings of a diameter smaller than about 150 µm.

9. The apparatus of claim 8, wherein said vibrating screen has openings which are not slot-shaped.

10. The apparatus of claim 8, wherein said vibrating screen has openings of a diameter of about 100 µm.

* * * * *